July 12, 1927.  A. O. ABBOTT, JR  1,635,241
VACUUM SHAPING MACHINE FOR STRAIGHT SIDE TIRES
Filed Oct. 22, 1925  3 Sheets-Sheet 1
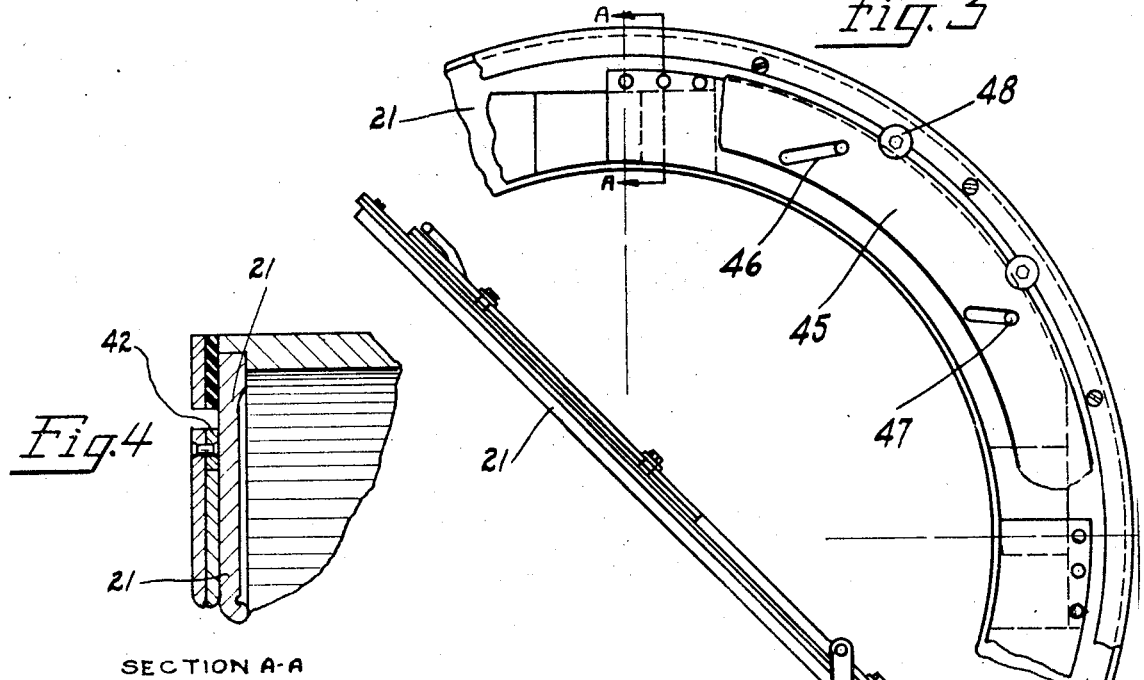
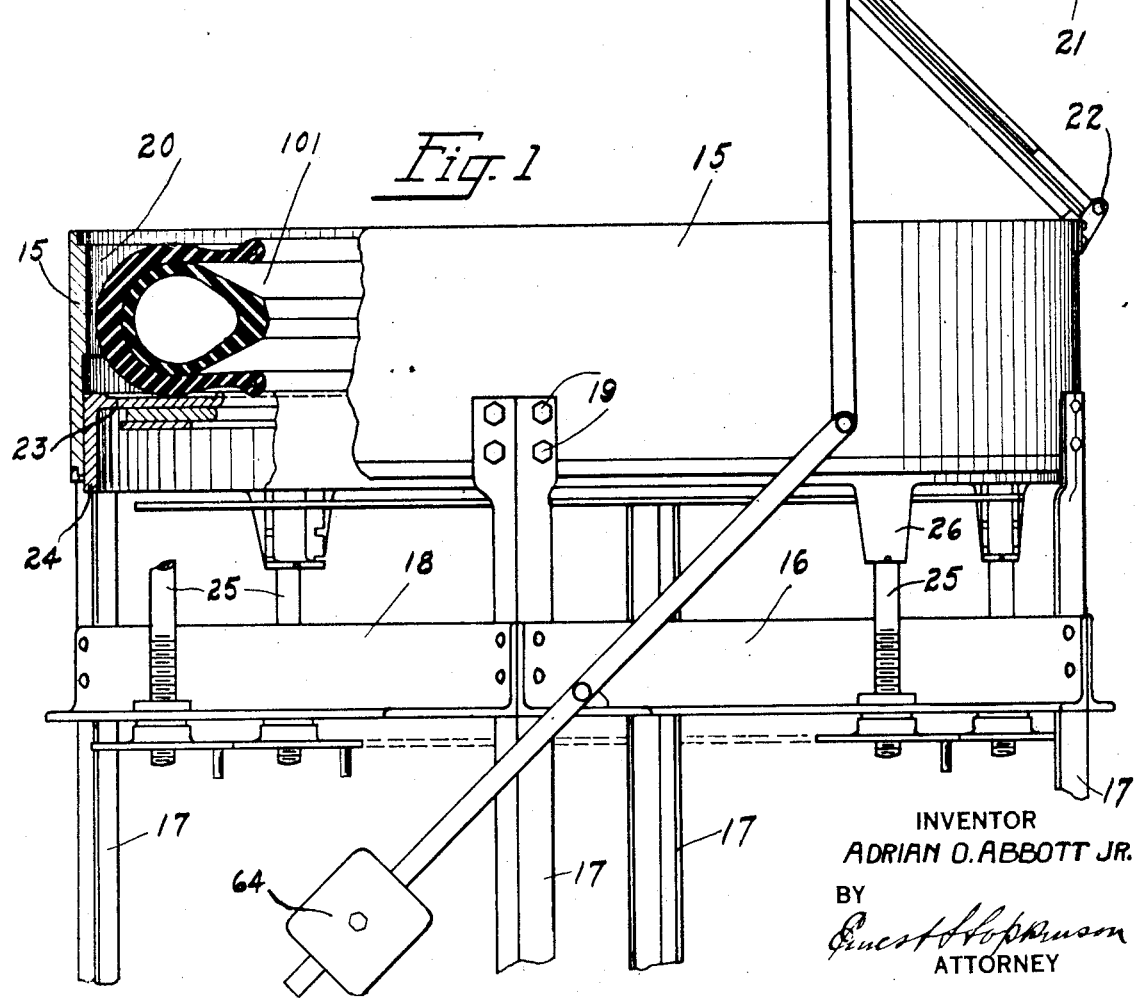
INVENTOR
ADRIAN O. ABBOTT, JR.
BY
Ernest Hopkinson
ATTORNEY July 12, 1927.
A. O. ABBOTT, JR
1,635,241
VACUUM SHAPING MACHINE FOR STRAIGHT SIDE TIRES
Filed Oct. 22, 1925   3 Sheets-Sheet 2
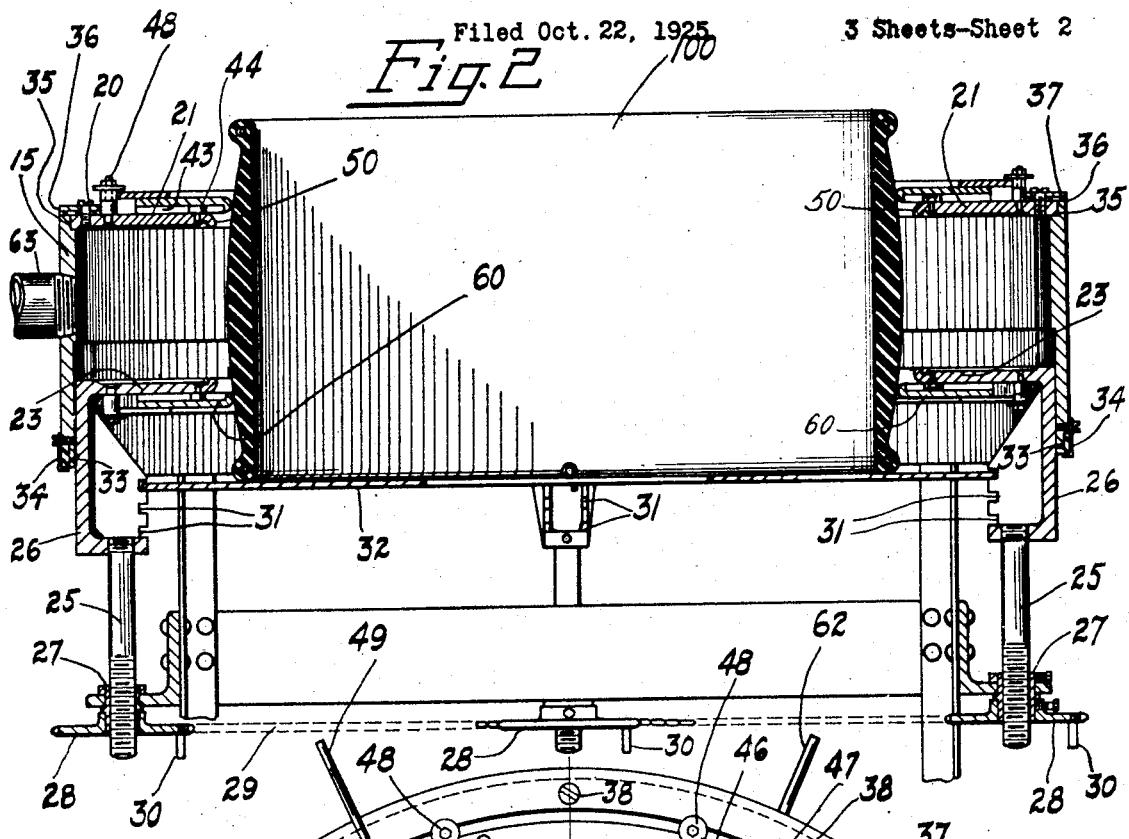
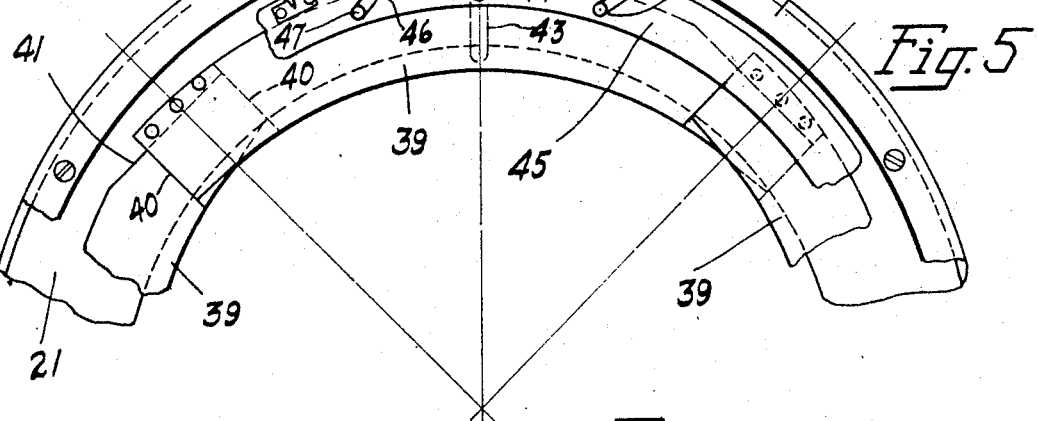
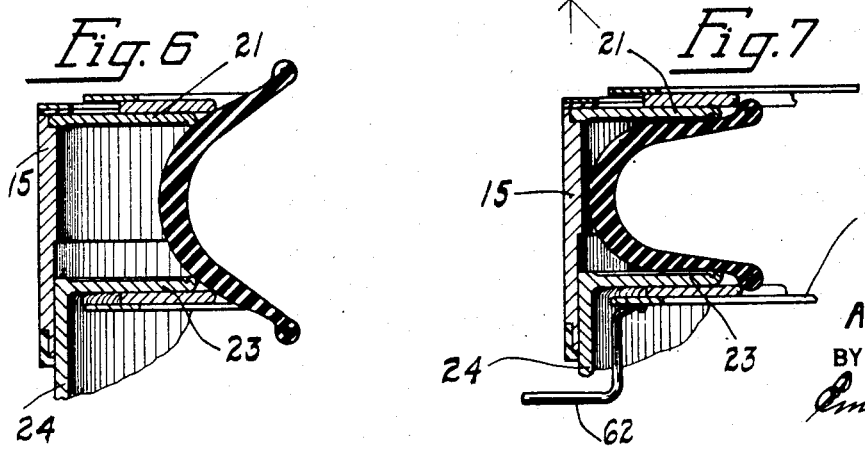
INVENTOR
ADRIAN O. ABBOTT JR.
BY
Ernest Hopkinson
ATTORNEY

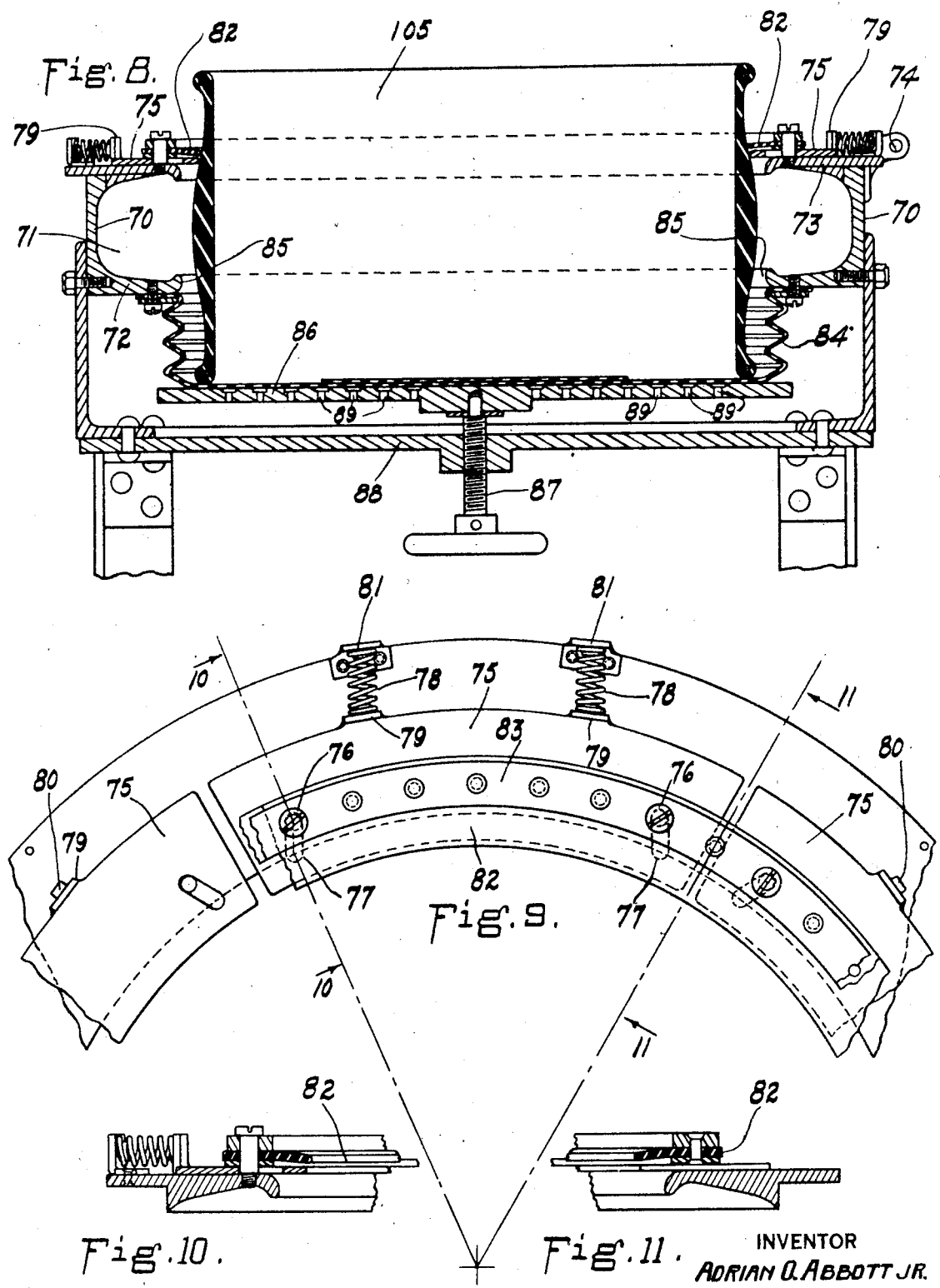

Patented July 12, 1927.

1,635,241

UNITED STATES PATENT OFFICE.

ADRIAN O. ABBOTT, JR., OF DETROIT, MICHIGAN, ASSIGNOR TO MORGAN AND WRIGHT, OF DETROIT, MICHIGAN, A CORPORATION OF MICHIGAN.

VACUUM SHAPING MACHINE FOR STRAIGHT-SIDE TIRES.

Application filed October 22, 1925. Serial No. 64,143.

This invention relates to apparatus for shaping tire casings for motor vehicles, but more particularly to improved vacuum shaping machines for straight side tires, and has for its primary object to facilitate the shaping of the tires by the vacuum process and to simplify the apparatus used therein.

Further objects of my invention are to eliminate the preliminary puffing or bulging step, to facilitate the adjustment for different sizes of casing, to provide a simple and effective initial seal, to facilitate the insertion of the "pulley band" or partially formed casing in the apparatus, to facilitate the insertion of the curing bag or other similar device after the "pulley band" has been drawn into the vacuum chamber, to provide increased adjustment between the top and bottom walls of the vacuum chamber, and to facilitate the centering of the tire with respect to the vacuum chamber.

The present invention is particularly an improvement on my earlier invention forming the subject matter of United States Letters Patent No. 1,507,563, Sept. 9, 1924, for method and apparatus for manufacturing tire casings, and reference may be had thereto for a more detailed description of the vacuum method and apparatus therefor. The term "pulley band" is used to indicate a tire casing for motor vehicles which has been built on a "drum" (flat or crowned) as distinguished from a "core." This "pulley band" is shaped into tire form in the manner which will be hereinafter described.

The many other objects and advantages of my invention will be better understood by reference to the following specification when considered in connection with the accompanying drawings illustrating certain selected embodiments thereof, in which:

Figure 1 is an elevation partially in section of one embodiment of the apparatus, the tire casing being fully expanded therein;

Fig. 2 is a diametrical section through the exhaust port of the embodiment shown in Fig. 1;

Fig. 3 is a plan view of a portion of the top wall of the vacuum chamber, the sectors being in retracted position;

Fig. 4 is a vertical section on the line A—A of Fig. 3;

Fig. 5 is substantially the same as Fig. 3, the sectors being in extended position;

Figs. 6 and 7 are detailed sectional views illustrating the expansion of the tire casing;

Fig. 8 is a diametrical section of a modified form of the apparatus;

Fig. 9 is a top plan view of a portion of the apparatus shown in Fig. 8, and

Figs. 10 and 11 are detailed sectional views on the line 10—10 and 11—11 respectively of Fig. 9.

Referring to the drawings and particularly to Figs. 1-7 inclusive, the apparatus comprises a cylindrical member 15 rigidly supported in horizontal position upon a frame or support 16 consisting of legs 17 and cross braces 18. The upper extremity of these legs is rigidly secured to the member 15 by screws or bolts as at 19. The cross braces 18 of the present embodiment are formed of angle irons which are screwed or bolted to the legs. The cylindrical member 15 forms the outer wall of the vacuum chamber 20. This chamber is annular in form and open on its inner periphery. The top wall 21 of this chamber is formed by a ring 21 which in the present embodiment is hingedly mounted on the outer wall 15 as at 22. The bottom wall 23 is provided at its outer edge with a depending annular flange 24 which slidably fits within the outer wall 15 and such bottom wall is supported by a series of adjusting screws 25, see Fig. 2, which have their upper ends seated in extensions 26 of such flange. The screws 25 extend downwardly through the horizontal portions of the braces 18 and fit within corresponding interiorly threaded sleeves 27 extending through and freely rotatable in such horizontal portions. On the lower end portion of each of these sleeves is secured a sprocket 28 and an operating chain 29 envelops all of such sprockets. Rotation of any one of the sprockets 28 will cause a like rotation of the other sprockets and thus uniformly raise or lower the lower plate 23, depending upon the direction of such rotation. Each of these sprockets is preferably provided with a handle 30 to enable any one of the sprockets to be operated manually. Slots 31 are provided in the casting to admit a plate 32 in any one of a series of adjusted positions. This plate 32 forms the support for the "pulley band" in the manner which will be fully described hereinafter, and such "pulley band" may be properly centered in front of the vacuum chamber by adjusting the plate in the proper slots. A gasket 33 preferably is seated in the lower edge of the outer wall 15 to form a tight seal between this wall and the bottom wall 23, and in the present embodiment this gasket is held in place by clips 34 at suitable intervals or by any other convenient means.

The top plate 21 fits in the channel or rabbet 35 in the upper edge of the outer plate 15 of the chamber and is preferably provided with a gasket 36 which is secured upon the upper face of the plate 21 by means of a ring 37 secured to such plate by screws 38 or other suitable means. This gasket extends over the joint between the top and outer plates and prevents the admission of air to the chamber at this point. A plurality of sectors 39 rests upon the upper face of the top plate and their opposing ends preferably overlap sufficiently so that this overlapping will occur in any position they may occupy. One end of each of the sectors is cut away as at 41 and the opposing end is provided on its under face with a block 42, as indicated in Fig. 4, which projects outside the cut-away edge of the opposing sector so that the sectors move together either inwardly or outwardly. The overlapping end portions of the sectors 39 are preferably cut away on their contact faces, as illustrated in this figure, so that a close joint is provided and only a negligible quantity of air will thus be permitted to pass through. The passage of air between the ends of the sectors is further prevented by means of the blocks 42 which fills in the space between each top sector and the plate 21 on which it rests. A shallow groove 43, Fig. 5, is preferably formed in the under face of each of the sectors and a pin 44 in the upper face of the top plate permits the sectors to only move radially. The sectors 39 are in the present embodiment operated by means of a ring 45 which rests on the sectors and is provided with a series of oblique slots 46 through which extend pins 47 projecting upwardly from and mounted in the corresponding sectors. The ring 45 is retained upon the upper plate and guided in its movement by a series of headed posts 48 and these posts permit the ring to turn freely about its axis. One or more handles 49 are preferably attached to this ring to enable the ring to be rotated and to thus cause the sectors to be moved inwardly or outwardly. The guide pins 44 prevent the segments being rotated with the ring 45. The sectors 39 form an auxiliary lip which may be caused to extend beyond the corresponding inner edge or lip 50 of the top plate and the purpose of this will be fully described presently.

Sectors 60, corresponding to the sectors 39 on the upper plate, are secured on the under face of the bottom plate 23 and the construction of these sectors and the mechanism for operating the same are identical with the corresponding parts on the upper plate except that their position is reversed. These sectors form an auxiliary lip on the lower plate in the same manner as the sectors 39 on the upper plate. The ring 61, corresponding to the ring 45, is adapted to be rotated by a handle 62 (Figs. 5 and 7). Assuming the sectors to be in their retracted position or that of Fig. 3, they are extended by pressing the handle 49 and 62 toward each other to the position indicated in Figs. 2 and 5 in which they are fully extended. The air is exhausted from the chamber 20 through the pipe 63 which passes through the outer wall 15. The top plate 21 is preferably supported by a counterweight 64 for reasons which will be fully explained hereinafter.

In Figs. 8-11 inclusive is shown a modified form of the invention in which the outer wall 70 of the vacuum chamber 71 is integral with the lower wall 72. The upper wall 73 of the chamber is hingedly mounted upon the outer wall 70 as at 74. A series of sectors 75 are radially slidable upon the top plate and are guided by posts or pins 76 which pass through corresponding parallel slots 77 therein. The sectors, instead of being manually extended as in the embodiment previously described, are normally pressed inwardly or extended by means of a series of springs 78 which act against upstanding lugs 79 thereon and are positioned by centering pins 80 on such lugs. The opposing end of each of these springs acts against an upstanding flange 81 secured on the outer edge portion of the top plate. The opposing ends of the sector do not overlap as was the case with the previous embodiment but move toward each other as the sectors are advanced. An elastic ring or gasket 82, preferably of rubber, is located adjacent the sectors so as to contact with the tire casing and to minimize leakage between the same and the sectors 75 as well as between the several sectors 75, when the vacuum is being applied to shape the casing. This gasket 82 is held in place by a metal ring 83 and thereby is held at one margin fixed against movement.

Instead of using another set of sectors to form an extension of the bottom 72 of the vacuum chamber, I have for the purpose of illustration provided a flexible bellows 84 preferably of rubber which has its outer edge secured to the lip 85 in the manner indicated in Fig. 8. The bellows 84 is supported by a plate 86 which is mounted upon the upper end of an adjusting screw 87. This screw passes through a threaded orifice in the supporting frame 88. This plate is preferably provided with a plurality of air ports 89 to permit the passage of air therethrough and thus maintain atmospheric pressure on the under face of the bellows. This plate 86 performs the same function as the plate 32 of the previous embodiment in providing an adjustable support for the "pulley band" and in enabling this "pulley band" to be centered opposite the vacuum chamber 71.

The mode of operating the apparatus shown in Figs. 1 to 7 inclusive is substantially the same as that described in my earlier patent previously referred to with the principal exception that the preliminary puffing or bulging of the pulley band is eliminated. The pulley band 100 is placed in the apparatus in the manner indicated in Fig. 2 and is properly centered relative to the vacuum chamber 20 by means of the adjusting screws 25. Any one of the sprocket wheels 28 may be rotated by means of its operating handle 30 and the movement of this sprocket wheel is transmitted uniformly to each of the other sprocket wheels by the chain 29. This raises or lowers the base plate or platform 32 and correspondingly moves the pulley band which has its lower edge resting thereon.

Having thus properly centered the pulley band relative to the vacuum chamber, the next step is to move the sectors 39 and 60 on the top and bottom plates 21 and 23 respectively outwardly into contact with the outer face of the "pulley band." This provides an initial seal for the vacuum chamber and the air in this chamber and the extension thereof may now be exhausted by vacuum producing mechanism, not shown, through the exhaust pipe 63. It is advisable that a large exhaust pipe be used. The reduction of the pressure within the vacuum chamber causes the "pulley band" to be gradually drawn into the chamber and as this takes place the auxiliary lips formed by the sectors are forced backwardly until the pulley band comes into contact with the rigid lips formed by the inner edges of the top and bottom plates of the chamber forming the final seal of the chamber. This position of the parts is shown in Fig. 6 of the drawing. The continued reduction of the pressure within the vacuum chamber causes the pulley band to be further drawn or forced into such chamber, as indicated in Fig. 7. The exhaust is shut off when the shaping or extension of the casing is completed. The curing bag or fluid pressure container 101 is next inserted within the shaped tire casing in the manner illustrated in Fig. 1. This curing bag may be of any suitable type. The curing bag is preferably placed within the casing in an empty condition and inflated after being positioned. This curing bag assists in maintaining the casing in shape. The shaped casing is now in condition to be removed from the chamber. The lid consisting of the top plate 21 with the extensible sectors thereon is lifted, as shown in Fig. 1, and maintained in elevated position by the counterweight 64. The shaped casing with curing bag therein may now be readily lifted from the chamber. Bead rings of the usual type may be placed upon the casing to clamp it upon the curing bag. The casing is now ready to be placed in a mold and vulcanized in the usual manner.

In the modified form of the apparatus shown in Figs. 8–11 inclusive, the "pulley band" 105 is placed in the apparatus in the manner indicated in Fig. 8 and centered relative to the vacuum chamber 71 by means of the adjusting screw 87. The bellows 84 forms a temporary seal by connecting the bottom wall 72 of the chamber with the bead of the "pulley band." The sectors 75 are pressed by the springs 78 against the outer face of the "pulley band." This forms a temporary seal between the pulley band and the top wall of the casing. The air within the chamber 71 and its extension are now exhausted and the "pulley band" is extended thereby until it is drawn into contact with the free edges or lips of the top and bottom plates 73 and 72 respectively. When the pulley band is thus brought into contact with the lips on the top and bottom walls of the chamber, the final seal of the chamber is completed. As the "pulley band" is being thus drawn outwardly into contact with fixed walls of the chamber, the sectors on the top plate are pressed rearwardly against the action of the springs 78, and at the same time the lower edge of the "pulley band" is drawn outwardly in contact with the bellows. The bellows should be capable of yielding slightly in order to prevent breaking the temporary seal before the pulley band finally seals on the lips of the fixed vacuum chamber. This combination of spring pressed sectors and bellows is illustrated and described to show two different forms of temporary sealing. Either of these forms may be used on both the top and bottom walls of the container as will be readily evident, but it is not generally advisable to use bellows on the top wall as such a construction tends to interfere with the placing of the curing bag in the chamber. In order to leave sufficient room for the application of the curing bag after the casing is formed, it would be necessary to remove the bellows or else make an auxiliary hinge cover out of it. This would tend to slow up the operation of the shaping machine and it is therefore not advisable to use such a bellows on the top wall. The spring pressed sectors shown in the modified form are advantageous in that they eliminate the necessity of manually operating these sectors, but they have the disadvantage of slightly interfering with the insertion of the curing bag because of the restricted opening.

From the foregoing description it will be obvious that a "pulley band" may be quickly placed in position to be shaped by the vacuum method and no preliminary bulging or puffing is necessary. The extensions on the permanent or fixed walls of the vacuum chamber form a temporary seal which continues until the pulley band is drawn into contact with such fixed walls and the final sealing of the chamber takes place. The elimination of the puffing or bulging step very materially simplifies both the construction of the apparatus and the operation of the same. The pulley band is quickly and easily centered relative to the vacuum chamber. The connecting of the supporting frame to the outer wall of the chamber enables the lower wall to be readily adjusted for different sizes of casing, a wider range of such adjustment and the use of a larger exhaust pipe.

The various embodiments are shown for the purpose of illustrating the principles of my invention and I am aware that the form and arrangement of parts may be very materially changed without departing from the spirit thereof. I therefore reserve the right to make all such variations as fairly fall within the scope of the following claims:—

Having thus described my invention, what I claim and desire to protect by Letters Patent is:

1. An apparatus for manufacturing tire casings comprising a hollow annular chamber open on its inner periphery and having top and bottom walls the inner margins of which are of a diameter greater than the bead diameter of the casing being manufactured, shiftable means for extending said walls to vary their inner girth and to provide initial contact with said casing and form with said casing a closure for the open side of said chamber, and means for exhausting said chamber.

2. An apparatus for manufacturing tire casings comprising a hollow annular chamber open on its inner periphery and having non-collapsible top and bottom walls the inner margins of which are of a diameter greater than the bead diameter of the casing being formed, bodily movable members initially extending between said margins and said casing to form therewith a closure for the open side of said chamber, and means for exhausting said chamber.

3. An apparatus for manufacturing tire casings comprising a hollow annular chamber open on its inner periphery and having top and bottom walls the inner margins of which are of a diameter greater than the bead diameter of the casing being formed, shiftable walls initially extending between said margins and said casing to form therewith a closure for the open side of said chamber, and means for exhausting said chamber, said shiftable walls being adapted to be forced rearwardly by the expanding of the casing until said casing is brought into contact with said margins and the final seal of said chamber established.

4. An apparatus for manufacturing tire casings comprising a non-collapsible hollow annular chamber U-shaped in cross-section and having top and bottom walls and an outer wall, shiftable means for extending said top and bottom walls, to vary the inner girth thereof, means for exhausting the chamber so as to shape a pulley-band to approximately tire form, and means for locating the pulley band in substantially symmetrical relation to said chamber prior to said shaping.

5. An apparatus for manufacturing tire casings comprising in combination a hollow chamber provided with an opening, means for positioning a pulley band opposite said opening and at an interval therefrom, and shiftable means for extending the top and bottom walls of said chamber to vary the inner girth thereof and to permit contact with said pulley-band.

6. An apparatus for manufacturing tire casings comprising in combination a hollow chamber provided with an opening, adjustable means for positioning a pulley band opposite said opening and at an interval therefrom, shiftable means for initially extending the top and bottom walls of said chamber to vary the inner girth thereof and to permit contact with said pulley-band, and means for exhausting said chamber and the extension thereof.

7. In apparatus for manufacturing tire casings by the vacuous method, a hollow annular chamber substantially U-shaped in cross-section and open on its inner periphery, and sector members mounted on one of the side walls of said chamber and movable radially thereon to form an inwardly projecting extension of said wall.

8. In apparatus for manufacturing tire casings by the vacuous method, a hollow annular chamber substantially U-shaped in cross-section and open on its inner periphery, and sector members mounted on one of the side walls of said chamber and movable radially thereon to form an inwardly projecting extension of said wall, said sector members overlapping at their ends to form a substantially continuous annular lip.

9. In apparatus for manufacturing tire casings by the vacuous method, a hollow annular chamber substantially U-shaped in cross-section and open on its inner periphery, and sector members mounted on one of the side walls of said chamber and movable radially thereon to form an inwardly projecting extension of said wall, said sector members having an elastic inner edge portion.

10. In apparatus for manufacturing tire casings by the vacuous method, a hollow annular chamber substantially U-shaped in cross section and open on its inner periphery, sector members mounted on one of the side walls of said chamber and movable radially thereon to form an inwardly projecting extension of said wall, and means for guiding said sector members.

11. In apparatus for manufacturing tire casings by the vacuous method, a hollow annular chamber substantially U-shaped in cross-section and open on its inner periphery, sector members mounted on one of the side walls of said chamber and movable radially thereon to form an inwardly projecting extension of said wall, and means for actuating said sector members including pins projecting laterally from said sectors, and a ring member provided with slots to receive said pins, said slots being disposed so that rotation of said ring in one direction will advance said members inwardly.

12. In apparatus for manufacturing tire casings by the vacuous method, a hollow annular chamber substantially U-shaped in cross-section and open on its inner periphery, rigid sector members mounted on one of the side walls of said chamber and movable radially thereon to form an inwardly projecting extension of said wall, and means for actuating said sector members including pins projecting laterally from said sectors, a ring member provided with slots to receive said pins, said slots being disposed so that rotation of said ring in one direction will advance said members inwardly, and means for manually actuating said ring.

13. In apparatus for manufacturing tire casings by the vacuous method, a hollow annular chamber substantially U-shaped in cross-section and open on its inner periphery, said chamber having top and bottom walls, a bellows member connected to the inner margin of said bottom wall, and an adjustable plate beneath said bellows forming a support for the casing being manufactured.

14. In apparatus for manufacturing tire casings by the vacuous method, a pulley band support, a hollow annular chamber substantially U-shaped in cross-section and open on its inner periphery, said chamber having a top wall, a bottom wall and a rear wall, the rear wall being fixed and the top and bottom walls movable relative thereto and relative to the axis of the annular chamber.

15. In apparatus for manufacturing tire casings by the vacuous method, a pulley band support, a hollow annular chamber substantially U-shaped in cross-section and open on its inner periphery, said chamber having a top wall, a bottom wall and a rear wall, the rear wall being fixed and the top and bottom walls being movable relative to said rear wall and relative to the axis of the annular chamber.

16. An apparatus for manufacturing tire casings by the vacuous method comprising a hollow annular chamber open on its inner periphery and having top and bottom walls and a rear wall, means movable on and coacting with said top and bottom walls and a pulley band to provide an initial seal for said chamber prior to the contacting of the band with said walls, and means for exhausting said chamber.

17. In apparatus for manufacturing tire casings by the vacuous method, a hollow annular chamber substantially U-shaped in cross-section and open on its inner periphery, said chamber having top and bottom walls, a bellows member connected to the inner margin of said bottom wall, and an adjustable plate beneath said bellows forming a support for the casing being manufactured, said plate having perforations therein to permit the passage of air therethrough to maintain atmospheric pressure on the under face of said bellows.

18. An apparatus for manufacturing tire casings by the vacuous method having a hollow annular chamber open on its inner periphery, in combination with means shiftable relative to the axis of the annular chamber for varying the girth of the inner repriphery.

19. In apparatus for manufacturing tire casings by the vacuous method, a hollow annular chamber open on its inner periphery and having side walls the inner edges of which are of a diameter greater than the bead diameter of the casing being manufactured, and means movable substantially radially of said chamber into contact with said casings to form an extension of said chamber and complete the closure thereof.

Signed at Detroit, county of Wayne, State of Michigan, this 15th day of October, 1925.

ADRIAN O. ABBOTT, Jr.